United States Patent [19]

Wallan

[11] Patent Number: 4,723,817
[45] Date of Patent: Feb. 9, 1988

[54] CONTROLLABLE TAILGATE FOR DUMP TRUCK

[76] Inventor: Kenneth R. Wallan, P.O. Box 245, Miranda, Calif. 95553

[21] Appl. No.: 882,769

[22] Filed: Jul. 7, 1986

[51] Int. Cl.⁴ .............................................. B60P 1/26
[52] U.S. Cl. ............................ 298/23 MD; 239/657; 296/51; 296/184; 298/23 M
[58] Field of Search ........... 298/23 R, 23 MD, 23 M, 298/23 S; 296/51, 56, 184; 239/657, 676; 414/472

[56] References Cited

U.S. PATENT DOCUMENTS

| | | | |
|---|---|---|---|
| 2,248,374 | 7/1941 | Mitchell | 296/51 |
| 2,344,755 | 3/1944 | Venard | 296/51 |
| 2,563,736 | 8/1951 | Newell | 296/51 |
| 2,645,522 | 7/1953 | Kersey | 298/23 MD |
| 2,762,628 | 9/1956 | Terry | 298/23 R X |
| 2,856,233 | 10/1958 | Boyce et al. | 298/23 M |
| 2,908,529 | 10/1959 | Davidson | 298/23 R X |
| 3,814,479 | 6/1974 | Vornberger | 298/23 M |

FOREIGN PATENT DOCUMENTS 663316 5/1963 Canada ................................ 239/657

Primary Examiner—Leslie J. Paperner
Attorney, Agent, or Firm—Owen, Wickersham & Erickson

[57] ABSTRACT

A controllable tailgate compatible with conventional rearward tilting dump trucks is attached at its uppermost corners to the upper end of two rear corner truck bed posts and pivots from a closed position to an open position enabling the discharge of material through an opening between the bottom of the tailgate and outer edge of the truck bed. The dump truck can be manufactured to accommodate the controllable tailgate or the truck bed can be modified by adding both a truck bed floor and two truck bed side-extension panels to match the truck bed to the tailgate. One or more movable gates are connected to the lower exterior of the tailgate across its width and are controllable from within the cab of the dump truck. The gates are moved to close the opening between the tailgate and truck bed when the dump truck is tilted rearward and the tailgate is in an open, unloading configuration. The gates serve to control the discharge of material from the dump truck. Linearly controlled cylinders driven by a compressed air source may be used to control the gates.

3 Claims, 6 Drawing Figures

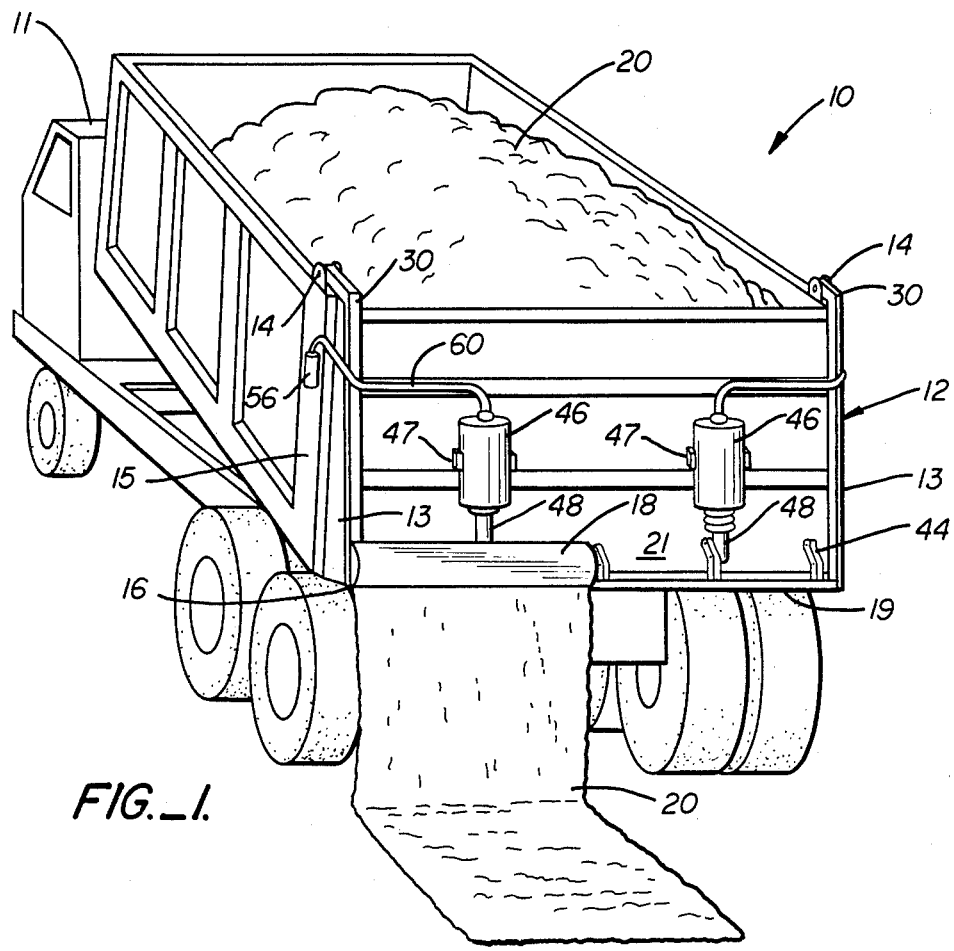
FIG._1.
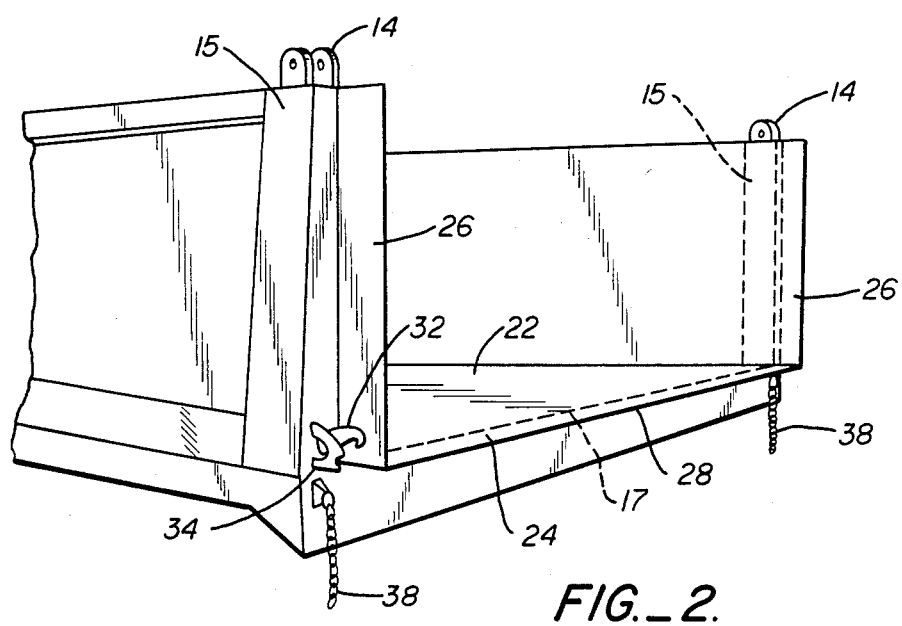
FIG._2.

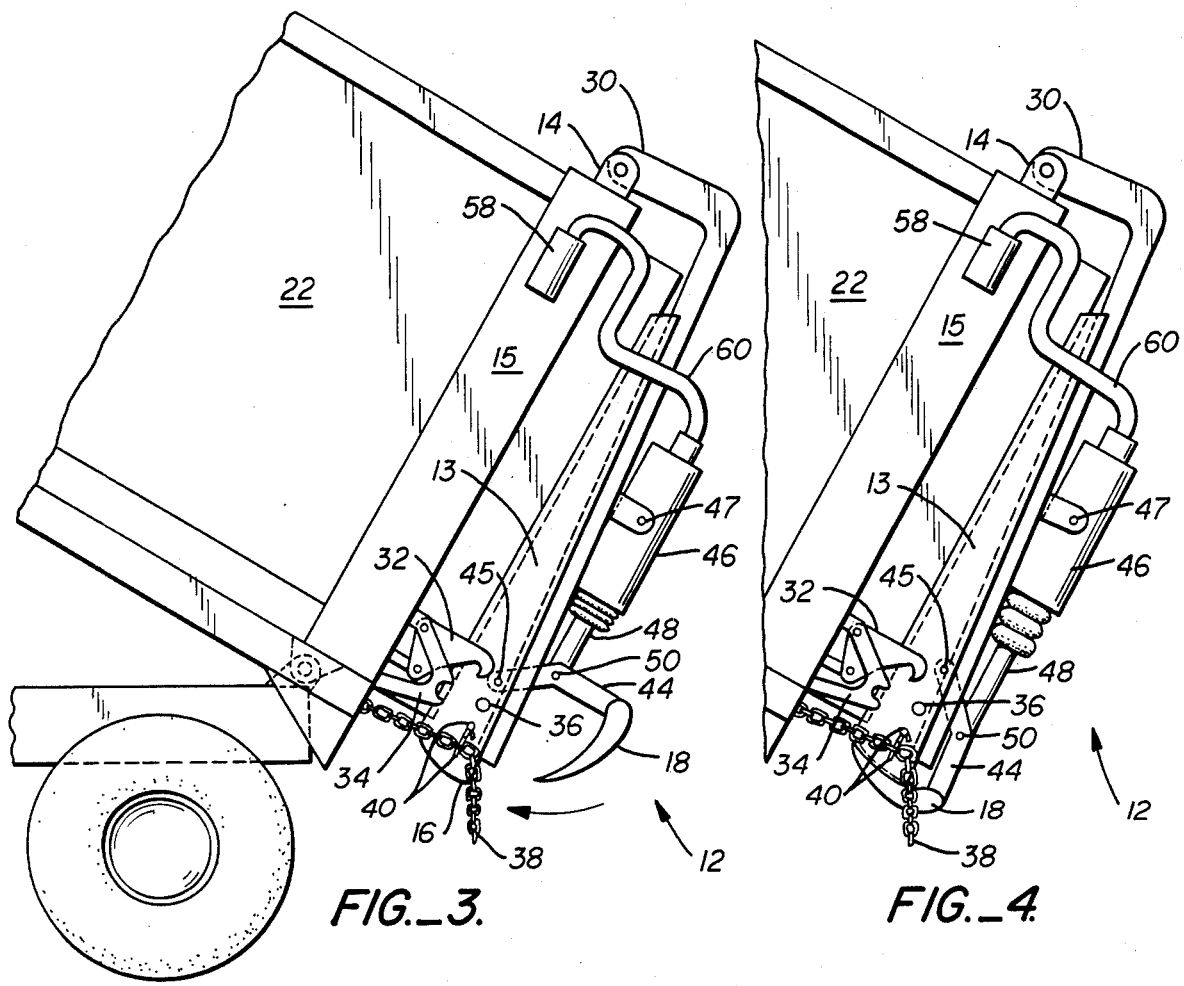
FIG._3.  FIG._4.
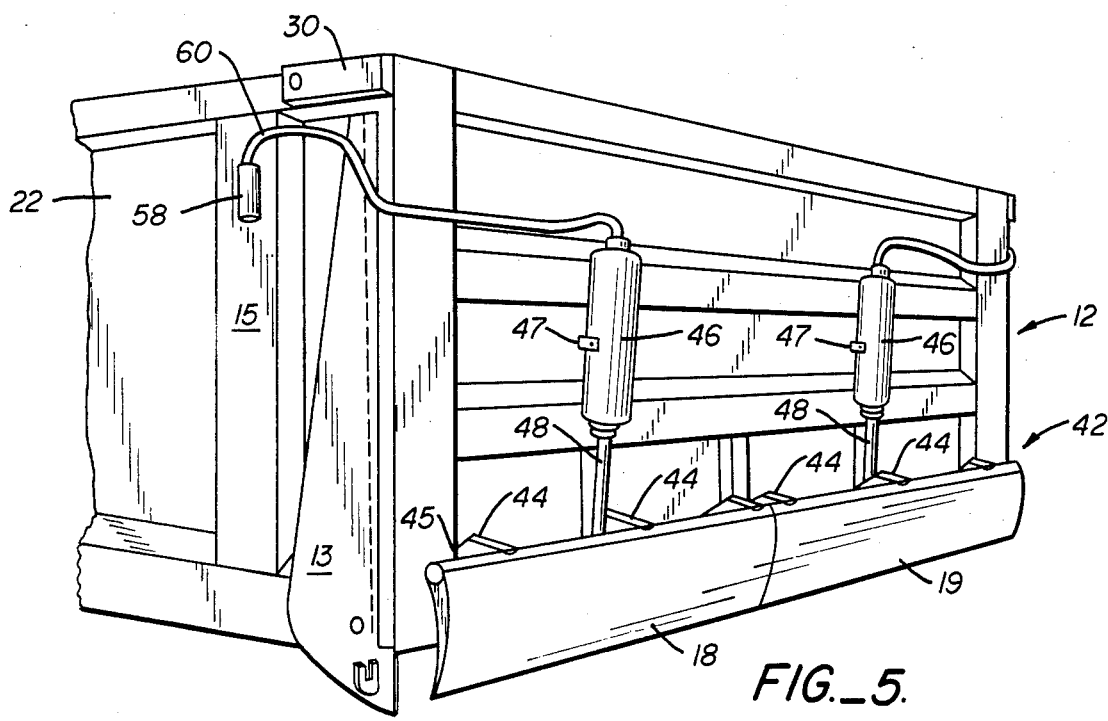
FIG._5.

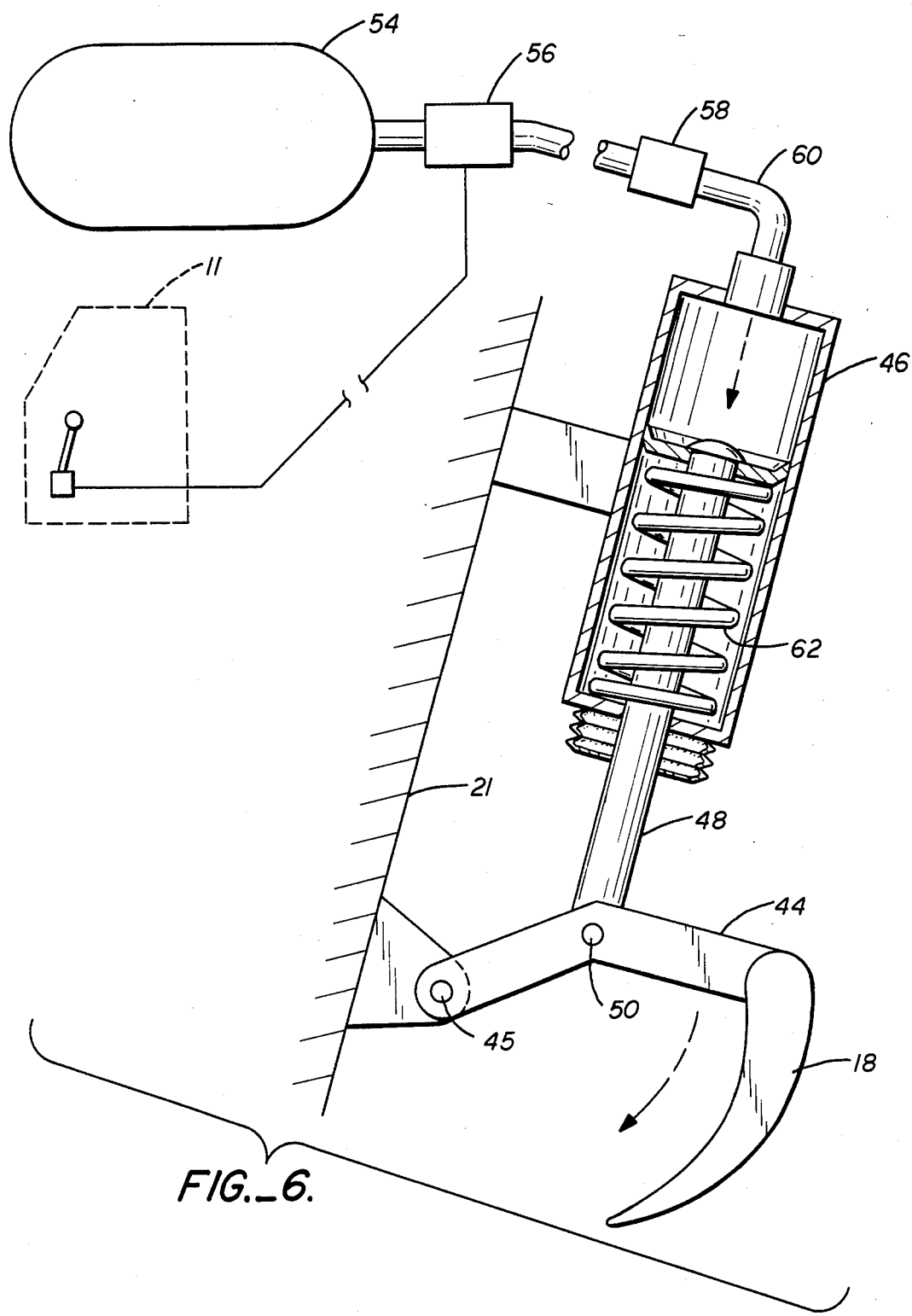
FIG._6.

CONTROLLABLE TAILGATE FOR DUMP TRUCK

This invention relates to dump truck tailgates and, more particularly, to a controllable tailgate which controls the flow of material released from a dump truck.

BACKGROUND OF THE INVENTION

General purpose dump trucks are conventionally constructed with a load-carrying bed mounted for tilting movement and a pivotally mounted tailgate closing the rear of the bed. In normal dump truck operation, the truck is moved to the location where the material is to be unloaded, and the forward end of the dump truck bed is raised. The operator then releases the tailgate of the dump truck bed so that the material gravitates out of the open rear end of the vehicle. Spreading of the material is then accomplished by moving the dump truck forward as the material is released.

In small, limited areas such as parking lots, driveways, cul-de-sacs, etc., it is difficult to spread the desired length and depth of material with a conventional dump truck. Once the tailgate is released, the only way to stop the flow of material before dumping all of the material retained within the truck is to lower the bed of the dump truck. The usual result is to scatter the material over a larger area, or to deposit uneven piles of material in the wrong places. Consequently, more equipment and/or labor is needed to distribute the dumped material at the desired location.

Heretofore, there have been several attempts to provide tailgate arrangements for varying or controlling the discharge rate of material from a dump truck. U.S. Pat. No. 3,361,475 discloses an auxiliary discharge control comprising a pivotally movable tailgate and a controllable chute therebelow for operator control of the rate of discharge. The chute is tilted rearward and forward thereby controlling the discharge of material from the truck. Other arrangements have included a tailgate construction adapted to provide a sealed truck bed for retaining bulk material disclosed in U.S. Pat. No. 1,952,833, then, when the tailgate was unlocked and lowered, the tailgate served as a dumping board. U.S. Pat. No. 1,735,930 teaches a tailgate arrangement comprising and end gate which could be suspended upright from its upper end and raised to discharge the load directly, or hinged at its lower end and dropped down so that the load would discharge therethrough when the body was tilted. Yet another arrangement disclosed in U.S. Pat. No. 2,248,374 comprised a windrowing gate which controlled and distributed the discharge of material, such as gravel, from the dump truck. Although useful to some degree, the aforesaid tailgate arrangements failed to provide sufficient variations and control of the discharge rate.

Therefore, a primary object of the present invention is to provide a controllable tailgate for a conventional dump truck, which provides superior control and variation of the discharge rate, thereby minimizing the need for subsequent labor and equipment to distribute material to the desired location and in the desired amount.

Another object of the present invention is to provide an auxiliary discharge control means for a dump truck which requires a minimum of operator intervention.

Another object of the present invention is to provide an auxiliary discharge control means for a dump truck which makes it possible to produce different widths of discharge.

Yet another object of the present invention is to provide an auxiliary discharge means which can be easily adapted to conventional dump truck load carrying bodies, without interfering with the normal operation of the dump truck.

SUMMARY OF THE INVENTION

In accordance with the principles of the present invention, a dump truck tailgate, pivotally mounted to the truck sidewalls at its uppermost corners, is provided with movable, adjustable gates attached to the bottom exterior thereof which are controllable from within the cab of the dump truck. The tailgate pivots from a closed position to an open position when the truck bed is tilted rearward in an unloading configuration, enabling the discharge of material through an opening along and below the bottom of the tailgate, between the tailgate and the edge of the bed. The movable gates attached to the tailgate can then be controlled effectively to close the opening between the bottom of the tailgate and the edge of the bed while the dump truck is tilted rearward in an unloading configuration.

A conventional dump truck bed may be modified with both a truck bed floor-extension panel and two truck bed side-extension panels which match the tailgate to the bed. However, dump trucks can also be manufactured to accommodate my controllable tailgate. In the modified conventional truck bed, my new tailgate fits over the extension panels and forms a close fit with the truck bed. Also, extended metal brackets are utilized to connect the tailgate to the bed at the upper end of two rear corner truck bed posts. In either type of dump truck, the tailgate is retained in the closed position by a hook-type latch member and seat combination, attached to a rearmost exterior lower corner of the bed. The latch member and seat combination engages a short pin extending perpendicularly outward from a tailgate side-panel nearest the latch member. The tailgate is retained in the open position by a chain, attached to the bed just below the latch member and seat combination, and a slotted ear assembly which engages the chain located below the short pin on the tailgate side-panel. The chain is manually adjusted and locked within the slotted ear assembly before the tailgate is released and the dump truck body is tilted rearward in an unloading configuration, thereby defining the size of the opening through which material will discharge.

The movable gates, which are controllable from within the truck cab, lie across the entire width of the tailgate and effectively close or open all or part of the opening between the bottom of said tailgate and the outer edge of the truck bed. Metal pivot arms connect these movable gates to the lower exterior of the tailgate. Linearly controlled actuator means connected through a linkage to the pivot arms are powered by a compressed air source to move the gates beneath the discharging material.

Other objects, advantages and features of the invention will become apparent from the following detailed description of one embodiment thereof presented in conjunction with the accompanying drawings.

BRIEF DESCRIPTION OF THE DRAWING

FIG. 1 is a rear view in perspective of a dump truck equipped with a controllable tailgate assembly according to the principles of the present invention.

FIG. 2 is a fragmentary view in perspective of the rear portion of a dump truck bed according to the principles of the present invention, with the tailgate assembly removed.

FIG. 3 is a fragmentary side view of the truck showing the controllable tailgate assembly in an unloading configuration, with the movable gates open.

FIG. 4 is a view similar to FIG. 3 also showing the controllable tailgate assembly shown in an unloading configuration, but with the movable gates closed.

FIG. 5 is a fragmentary rear view in perspective of the truck of FIG. 1 with the controllable tailgate closed.

FIG. 6 is an exploded side view of the actuator means of the controllable tailgate assembly including a diagrammatic representation of the power source.

DETAILED DESCRIPTION OF THE PREFERRED EMBODIMENT

With reference to the drawing, FIG. 1 shows a dump truck 10 and cab 11 equipped with a controllable tailgate 12 according to the present invention. Essentially, the tailgate 12 controls the flow of material when the dump truck 10 is in a rearward tilted unloading configuration, as shown. The tailgate 12 has two matching side panels 13 extending vertically up both sides of the tailgate 12. The tailgate 12 is mounted at its uppermost corners to brackets 14 on the top of two rear truck bed sidewall end posts 15 (FIG. 2). The tailgate 12 pivots from a closed position to an open position by gravity, creating an opening 16 between the lowermost portion of the tailgate 12 (FIG. 3) and the outer edge 17 of the truck bed (FIG. 2) through which retained material 20 will discharge.

Movable gates 18 and 19 connected to a lower exterior wall 21 of the tailgate are controlled from within the cab 11 of the dump truck 10 and pivot from an "open" position, and shown in FIG. 3, to move beneath the opening 16 in a "closed" position, as shown in FIG. 4; this configuration effectively limits the discharge of material 20 from the dump truck. The tailgate side panels 13 are curved at the bottom thereof, so gates 18 and 19 are also curved to provide an effective enclosure with the tailgate side panels 13. The two gates 18 and 19 are shown in FIG. 1, with only one closed, thereby only partially limiting the width of discharge of material 20. Both gates 18 and 19 could be closed to completely stop the discharge of material 20 or both could be open. Furthermore, three or four gates of lesser widths could be employed to provide different widths of discharge.

The dump truck 10 can be manufactured to accommodate the controllable tailgate 12 or a conventional dump truck bed 22 can be modified to accommodate the controllable tailgate assembly according to the present invention as shown in FIG. 2. A truck bed floor-extension panel 24 is provided to accommodate the movable gates in their closed position. Two truck bed side-panels 26 extend rearwardly from the truck bed sidewall end posts 15 (e.g., 5–6 inches) and are provided to form a close fit with the sides of the tailgate assembly. Material can only discharge or flow through the bottom opening 16 between the tailgate 12 and an outer edge 28 of the truck bed floor-extension panel 24. The panels 24 and 26 are connected to the dump truck bed 22 by a conventional welding technique. The tailgate 12 fits over the extension panels 26, thereby forming a close fit between the tailgate 12, and the truck bed 22.

FIG. 3 is a side view of a dump truck 10 equipped with a controllable tailgate 12 in an unloading configuration. The controllable tailgate 12 is shown in an unlocked, unloading configuration with the movable gates 18 and 19 in an open position. The brackets 14 on top of the truck bed sidewall posts 15 receive extended metal hinges 30 of the tailgate 12. This configuration enables the tailgate 12 to pivot to an open position by gravity when unlocked and the bed 22 is tilted rearward. The tailgate 12 may be retained in its closed position by the combination of a hook-type latch member 32 and a seat 34, both located on a rearmost exterior lower corner of the bed 22. The latch member 32 and seat 34 combination engage a short pin 36 attached to and extending perpendicularly outward from a tailgate side-panel 13 nearest the latch member 32 and seat 34. The pin 36 fits into the seat 34 and is held in place by the latch member 32. The tailgate 12 can be unlocked or released from its closed position by the truck operator from within the cab 11 of the dump truck 10 using a conventional control including a relay (not shown). The relay is electrically switched open which allows a compressed air source to expel air through a line connected to the latch member 32 which releases the pin 36 from the seat 34.

The tailgate is retained in its open position by gravity, and its outward swing is limited by two identical chains 38, attached to each lower exterior corner of the bed 22 as shown in FIG. 2. The dump truck operator manually adjusts the length of the chain 38 before releasing the tailgate and placing the dump truck 10 in an unloading configuration. The chain 38 is adjusted by locking it within slotted ear assemblies 40 which are located on each tailgate side-panels 13. This arrangement enables the operator to define the size of the opening 16 through which material will discharge. By defining the size of the opening 16, the operator controls the rate at which material will discharge. FIG. 4 shows another side view of the dump truck 10 equipped with the controllable tailgate 12, with the movable gates 18 and 19 in a closed position.

The controllable tailgate 12 comprises the movable gates 18 and 19, as previously described. Pivot arms 44, having a dog-leg shape, connect the tailgate 12 and the movable gates 18 and 19. The pivot arms 44 are mounted on a pivot pin 45 to the lower exterior of the tailgate 12, as shown in FIGS. 3, 4 and 5. Cylindrical linearly controlled actuator means 46 are also pivotally connected by a pin 47 to the exterior of the tailgate 12 as shown in FIG. 3. The actuator means 46 control the movable gate 18 by extending and retracting a vertical linearly moving shaft 48 pivotally connected by another pivot pin 50 to the pivot arms 44, as shown in FIG. 6. The actuator means 46 extend the shaft 48 to close the gate 18 and withdraw the shaft 48 to open the gate 18. Dual actuator means 46 are shown in FIG. 5 which pivot the gates 18 and 19 to their closed position and back to their open position. Each actutor means 46 is dedicated to a single movable gate; the number of actuator means 46 will correspond directly to the number of movable gates. The actuator means 46 described herein are pneumatic cylinders each having a piston with a spring return and driven by a compressed air source 54, as shown diagramatically in FIG. 6. Other types of linear actuators could be used such as double acting actuators, or their equivalent. In the embodiment shown, the air source 54 supplies compressed air to a pair of valves 56, one for each actuator means 46, located underneath the truck bed. Each valve 56 governs the release of air to one of a pair of couplers 58 located on the outside upper portion of both truck bed sidewall end posts 15. This arrangement facilitates removal of air hoses 60 extending to each of the actuators 46, in the event of repair or replacement of the tailgate 12. When the selected valve 56 is opened by a control in the truck cab, air is released through its coupler 58, and its connected actuator 46 is pressurized, extending the vertical shaft 48 to close the gate 18. When pressure is removed, a spring 62 retracts the shaft 48 to open or spring back the gate 18. The dump truck 10 is tilted rearward with the tailgate 12 unlocked in an open position. Then the movable gates 18 and 19 are opened by the dump truck operator to control the discharge as the dump truck 10 is moved forward.

In summary, the controllable tailgate assembly 12 according to the present invention gives the dump truck operator the ability to control the width of material discharged from the dump truck 10. The tailgate assembly can be controlled from within the cab of the dump truck. Conventional dump trucks need only slight modifications to accommodate the tailgate assembly. Through the use of the present invention, the need for additional labor and equipment to distribute dumped material to the desired location in the desired amounts is obviated. Consequently, the spreading of material from a dump truck can be accomplished with greater efficiency, speed and economy.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. In combination with a dump truck having a cab and body with a load carrying bed mounted for rearward tilting movement, said bed being open at its lower rear end and having side walls terminating at the rear outer edge of said bed and having there an uppermost edge, a controllable tailgate assembly comprising:

a tailgate pivotally mounted across said open rear end between the uppermost rearward portions of said side walls thereby enabling said tailgate to pivot from a closed position to an open position enabling the discharge of material retained on said bed;

two tailgate side panels extending vertically along the side of said tailgate;

controllable latch means for retaining said tailgate in a closed position and for releasing it to pivot into said open position;

chain means attached to at least one lower exterior corner of said bed, and slot means located on the lower portion of each of said tailgate side panels for retaining said chain means at a manually adjustable position, said chain and slot means serving to limit the amount of an opening provided at the end of the truck bed by said tailgate when said truck bed is rearward;

a truck bed floor-extension panel and two bed side-extension panels which extend parallel and adjacent to said tailgate side panels;

extended metal brackets for connecting said tailgate to said bed at its uppermost corners; and discharge control means including:

at least two movable auxiliary gates attached across the lower exterior of said tailgate which effectively close said opening between the bottom of said tailgate and said outer edge of said bed, each said auxiliary gate having generally an elongated rectangular shape, means pivotally connecting said auxiliary gates to said tailgate, a pivot arm connected near an outer edge of each said gate, actuator means attached to said tailgate and having a linearly movable shaft connected to said pivot arm for moving each said gate downwardly, under said tailgate and under the end of the truck bed to close said opening;

a control valve for each said gate connected to a fluid pressure source;

a separate control handle within the truck cab for each said movable gate and connected to one said control valve for a said actuator, whereby each of the gates is separately controllable from within the cab of said truck for closing and opening said gates to control the flow of material from the truck as it is moving.

2. In combination with a dump truck having a cab and having a horizontal load carrying bed mounted for rearward tilting movement, said bed being open at its rear end and having side walls terminating at the rear outer edge of said bed, and connection means attached to the uppermost edges of said side walls, a controllable tailgate assembly comprising:

a tailgate pivotally mounted on said connection means and extending across said open rear end between said side walls, thereby enabling tailgate to pivot from a closed position to an open position to create an opening between its lower edge and the rear end of the truck bed when said bed is tilted;

locking means controllable from within the truck cab for retaining said tailgate in the closed position and for unlocking it to create said opening when said bed is tilted;

limit means for limiting the open position of said tailgate when said bed is tilted rearward, and tailgate discharge control means comprising:

a plurality of individual movable auxiliary gates having a generally elongated rectangular shape, pivotally attached to and extending across a lower exterior wall portion of said tailgate, said gates being large enough so that when both are in a first or closed position they effectively block said entire opening between the bottom of said opened tailgate and the outer edge of said bed to prevent the flow of material, said gates being separately movable to a second or open position wherein they do not obstruct said opening;

actuator means connected to each said gate and having a linearly movable shaft;

a pivot arm connected at one end near the outer edge of each said gate, a movable shaft of one said actuator means connected to said pivot arm for moving said gate under said lower exterior wall portion of said tailgate and under the end of said truck bed to close said opening; and control means located within the truck cab and connected to said actuator means, said control means being operable for rapidly moving one or more of said gates to or from their open or closed position thereby controlling the flow of material from said truck bed through all or a portion of said opening while the truck is moving.

3. The dump truck and tailgate assembly combination as described in claim 2 wherein said actuator means comprises a separate linearly movable actuator for each said gate, each said actuator being connected through a control valve to a source of compressed air in said truck, and a control handle for each said actuator within said truck cab connected to said control valve, whereby a driver of the truck can readily control said gates and thus the discharge of material through said opening while the truck is moving.

* * * * *